F. H. C. COPPUS
STEAM TURBINE.
APPLICATION FILED SEPT. 18, 1911.

1,056,151.

Patented Mar. 18, 1913.

Witnesses.
R. D. Tolman.
Penelope Cumberbach.

Inventor
Frans H. C. Coppus
By Rufus B. Fowler
Attorney

UNITED STATES PATENT OFFICE.

FRANS H. C. COPPUS, OF WORCESTER, MASSACHUSETTS, ASSIGNOR TO COPPUS ENGINEERING AND EQUIPMENT COMPANY, OF WORCESTER, MASSACHUSETTS, A CORPORATION OF MASSACHUSETTS.

STEAM-TURBINE.

1,056,151. Specification of Letters Patent. Patented Mar. 18, 1913.

Application filed September 18, 1911. Serial No. 649,845.

*To all whom it may concern:*

Be it known that I, FRANS H. C. COPPUS, a citizen of the United States, residing at Worcester, in the county of Worcester and Commonwealth of Massachusetts, have invented a new and useful Improvement in Steam-Turbines, of which the following is a specification.

My invention relates to steam turbines comprising a revolving wheel inclosed in a casing and mounted upon one end of a shaft, with means for admitting steam under pressure into the casing to operate said wheel. The casing is provided with a hub arranged to inclose the shaft, with the mechanism to be operated mounted upon the other end of the hub and arranged to be driven by the shaft.

The objects of my invention are to improve the means for conducting steam under pressure to the turbine casing; to provide an improved means for water packing the journal bearing of the turbine shaft; to provide a protection for the outer end of the turbine shaft, and to provide a means of receiving the longitudinal thrust of the turbine shaft. The mechanism by which these objects are accomplished is shown in the accompanying drawing, in which—

Figure 1:
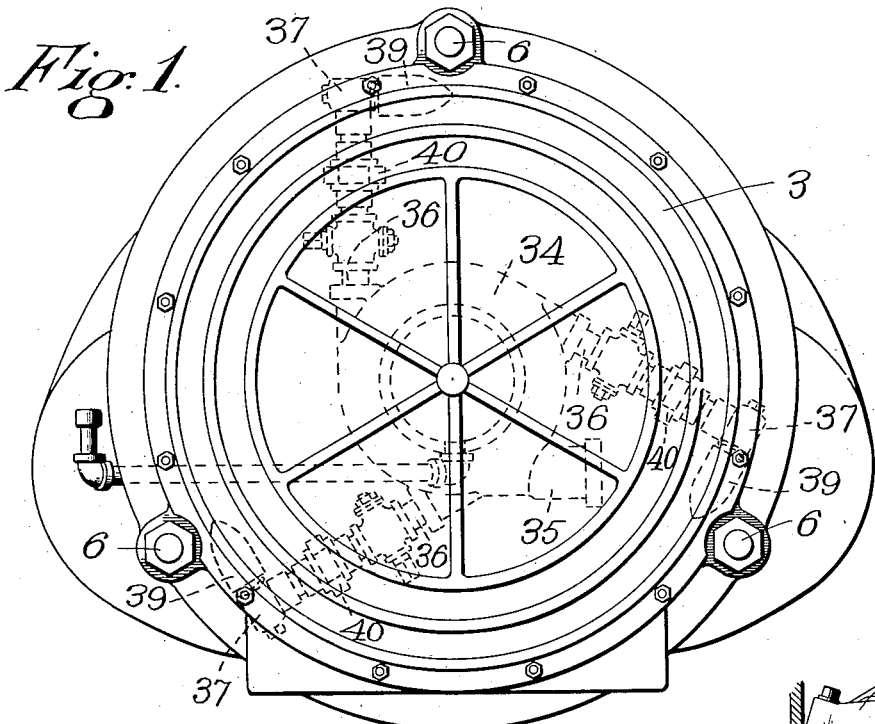
Figures 2, 3:
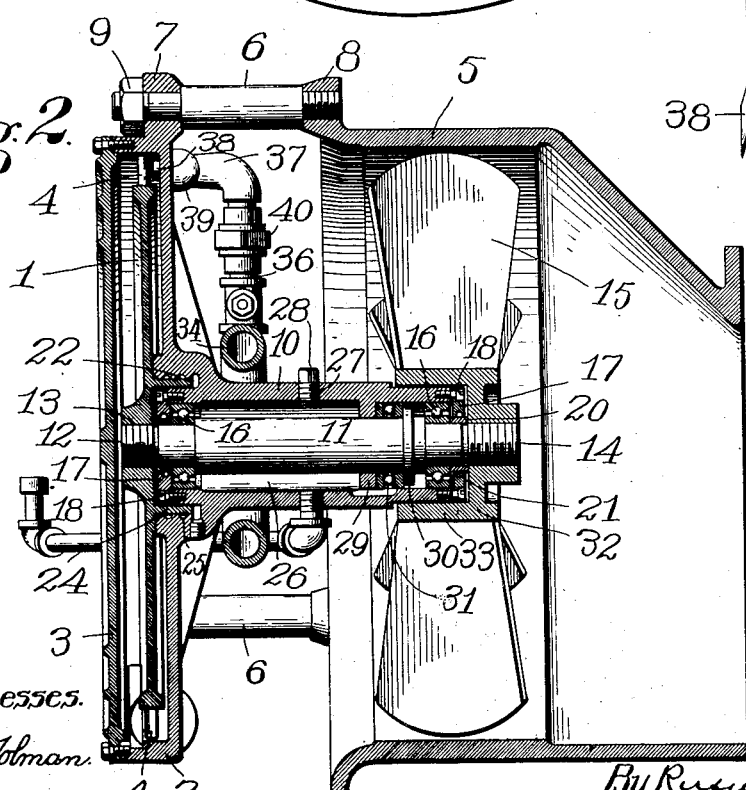

Figure 1 is a front view of my improved turbine. Fig. 2 is a central sectional view of the same. Fig. 3 is a plan view of one of the steam nozzles.

Similar reference characters refer to similar parts in the different figures.

The turbine wheel 1 is inclosed in a casing 2 provided with a cover 3 inclosing the wheel, forming a steam chamber and provided with blades 4, which are similar to the blades of steam turbines now in use. The casing 2 is supported from a casing 5 by bolts 6 which, in the present case, are three in number and pass through ears 7 on the casing 2 and are held in the casing 5 by ears 8. The casing 2 is held in place on the bolts 6 by nuts 9, which allow the casing 2 to be removed.

Extending rearwardly from the casing 2 is a hub 10 inclosing the shaft 11 and providing journal bearings for both ends of the same. The forward end 12 of the shaft 11 is arranged to support the turbine wheel 1 by the screw threads 13, and the rear end 14 of the shaft 11 is screw threaded and supports the driven mechanism which is to be revolved by the turbine wheel 1. In the present instance I have shown upon the rear end 14 of the shaft 11 a fan 15, which is inclosed by the casing 5 and is arranged to supply a current of air beneath the fire of a boiler. Any other article, however, whose revolution is desired may be attached to the end 14 of the shaft 11.

The hub 10 is provided at its opposite ends with ball bearings 16 and at either end of the hub 10 beyond the ball bearings 16 are annular covers 17 for the ball bearings, attached to the ends of the hubs 10 by screws 18. Between the shaft 11 and the covers 17 are interposed rings 20, and in the inner edge of each cover 17 is an annular groove 21 to hold oil.

The hub 10 next the casing 2 is enlarged and provided with an annular channel or recess 22 arranged to receive a flange 24 attached to the turbine wheel 1. The outer wall of the recess is provided with grooves 25 to hold water from the condensed steam from the casing 2 and form a water packing to prevent additional escape of steam from the casing 2. Between the ball bearings 16 the hub 10 incloses an annular chamber 26 which is utilized as an oil chamber for the lubrication of the shaft 11, the oil being admitted through the opening 27 closed by the plug 28. At one end of the chamber 26 the hub 10 has an interior flange 29, and between the flange 29 and a fixed collar 30 on the shaft 11 is a ball bearing 31 arranged to receive the longitudinal thrust of the shaft 11. The fan 15 is carried by a hub 32 attached to the screw threaded end 14 of the shaft 11, said hub having a flange 33 which incloses the end of the hub 10, thereby protecting the inclosed journal bearing from the entrance of dirt or dust.

Steam is admitted to the casing 2 to rotate the turbine 1 from an annular pipe 34 connected with a source of steam under pressure by a pipe 35. The annular pipe 34 surrounds the hub 10 between the casings 2 and 5 and communicates with the casing 2 by pipes 36, in the present instance three in number, and they are arranged in a tangential position to the annular pipe 34, with the outer end 37 of each pipe 36 provided with a nozzle 38 through which steam is delivered at the proper angle to the blades 4 of the turbine 1. The nozzles 38 are slightly tapered and fit a corresponding tapered hole in an enlargement 39 integral with the casing 2. The nozzles 38 are connected with the pipes 36 by unions 40, allowing each nozzle to be removed from the casing 2.

It has been proposed heretofore to take steam from a chamber integral with the casing 2. By my improved construction the annular pipe 34 is separate from the casing of the machine and also from the hub 10, as are the tangential pipes 36, thereby preventing the radiation of heat through the metal of the casing and providing space for the application of a nonheatconducting material to both the pipe 34 and the pipes 36.

I claim,

1. In a steam turbine, a turbine wheel arranged to be operated by steam under pressure, a casing inclosing said wheel, means for admitting steam under pressure to said casing, comprising an annular steam pipe communicating with a source of steam under pressure, pipes communicating with said annular pipe and tangential thereto, having their outer ends provided with nozzles entering said casing and removable therefrom.

2. In a steam turbine, a turbine wheel having a shaft, a casing inclosing said wheel having an elongated fixed hub inclosing said shaft, ball bearings between said shaft and the opposite ends of said fixed hub, a rotatable hub carried by the outer end of said shaft, and a flange on said rotatable hub overlapping the end of said fixed hub.

3. In a steam turbine, a turbine wheel arranged to be operated by steam under pressure, a casing inclosing said wheel provided with an annular recess in its inner wall, and a flange on said wheel concentric with its axis of rotation and inclosed in said recess, with the wall of said recess provided with grooves for a water packing.

4. In a steam turbine, a turbine wheel arranged to be operated by steam under pressure, a casing inclosing said wheel, a series of removable nozzles held in said casing at an angle to the plane of rotation of said wheel, and means for supplying steam to said nozzles under pressure, comprising an annular steam pipe communicating with a source of steam under pressure, and pipes tangential thereto and communicating with said annular pipe and said removable nozzles.

5. In a steam turbine, a turbine wheel arranged to be operated by steam under pressure, a shaft for said wheel, a casing inclosing said wheel provided with an elongated hub inclosing said shaft, journal bearings for said shaft at opposite ends of said hub, with an inclosed annular chamber between said journal bearings.

6. In a mechanism of the class described, a casing inclosing a chamber for a turbine wheel and provided on one side with an elongated hub inclosing the wheel shaft, a second casing inclosing the free end of said hub, means for detachably connecting the peripheries of said casings, a shaft journaled in said hub, a turbine wheel carried by one end of said shaft, and a fan carried by the opposite end of said shaft and inclosed in said second casing.

Dated this 8th day of September 1911.

FRANS H. C. COPPUS.

Witnesses:
PENELOPE COMBERBACH,
NELLIE WHALEN.